United States Patent [19]

Samson

[11] Patent Number: 5,081,868
[45] Date of Patent: Jan. 21, 1992

[54] SPEEDOMETER CONVERSION

[75] Inventor: Jean-Paul Samson, Valcourt, Canada

[73] Assignee: Bombardier, Inc., Canada

[21] Appl. No.: 550,995

[22] Filed: Jul. 11, 1990

[30] Foreign Application Priority Data

Sep. 27, 1989 [CA] Canada .................................. 613795

[51] Int. Cl.⁵ ............................ G01P 3/18; G01P 5/00
[52] U.S. Cl. ...................................... 73/532; 116/62.2
[58] Field of Search .................. 73/528, 532; 324/160;
116/62.2, DIG. 47; 74/12

[56] References Cited

U.S. PATENT DOCUMENTS 3,446,178 5/1969 St. Clair et al. ............ 116/DIG. 47

4,173,147 11/1979 Zathy ................................. 116/62.2
4,284,028 8/1981 Swanburg ............................ 73/528

FOREIGN PATENT DOCUMENTS 1163835 3/1984 Canada .

Primary Examiner—Walter E. Snow
Attorney, Agent, or Firm—Larson and Taylor

[57] ABSTRACT

A speedometer drive arrangement particularly suitable for use in snowmobiles is readily convertible to give a readout that is in Mph or Kph, while providing only a single scale on the face of the instrument. The change is effected by the interposition of a small geared drive immediately between the rear of the speedometer instrument and the input of the cable drive.

3 Claims, 2 Drawing Sheets

SPEEDOMETER CONVERSION

BACKGROUND OF THE INVENTION (a) Field of the Invention

This invention relates to a new or improved speedometer conversion arrangement whereby the speedometer drive can be rapidly converted so that the readout of the speedometer instrument is changed from one scale to another, e.g. from miles per hour (Mph) to kilometers per hour (Kph).

(b) Description of the Prior Art

Vehicles sold in Canada and in other countries must have speedometer drives that are calibrated to give a readout in kilometers per hour whereas for use in the United States of America the readout must be in miles per hour. It is of course possible on a dial type speedometer instrument to include both a Kph and a Mph scale arranged concentrically with respect to an angularly rotatable movable needle so that the vehicle operator can read out the speed from either scale as desired. This arrangement however has some drawbacks, not the least of which is the difficulty for the operator to distinguish between the two scales. Of course one scale may be given greater prominence than the other, but then the operator is at even more of a disadvantage when the vehicle is being used in a jurisdiction where the secondary scale of his speedometer is in fact the one which is of legal effect in respect of posted speed limits and the like.

The aim of this invention is to provide a speedometer system particularly although not exclusively suitable for use in vehicles such as snowmobiles, where the dial type instrument displays only a single scale, but where the speedometer system is readily adaptable so that the indicator scale is a readout of kilometers per hour or miles per hour selectively.

SUMMARY OF THE INVENTION

The invention provides a speedometer readout instrument having an input element that is adapted to be coupled to a speedometer drive cable in a vehicle, said instrument being calibrated to provide a readout of the speed of said vehicle in a given first scale of units, means for interposing a changed transmission ratio between said drive cable and said input element such that the readout is converted to be in a second scale of units, and means for selectively indicating in the readout the scale of units that is being displayed.

The means for interposing a changed transmission ratio between the drive cable and the input element may comprise a selfcontained geared unit that can be attached selectively between the input element and the drive cable when it is desired to change the scale of units. In another configuration such a geared unit may be permanently positioned on the speedometer input, the geared unit having alternate attachment points for the drive cable in each of which a different gear ratio is engaged.

The means for selectively indicating the scale of the units being displayed may comprise a window opening in the face of the instrument and a simple slide element supported to the rear of the dial face and having in different locations the different scale indications, either of which may be displayed by appropriate movement of the slide. The slide may be accessible through the rear of the speedometer instrument for manipulation e.g. by a screwdriver or the like.

BRIEF DESCRIPTION OF THE DRAWINGS

The invention will further being described, by way of example only, with reference to the accompanying drawings wherein.

DESCRIPTION OF THE PREFERRED EMBODIMENT

Figure 1:
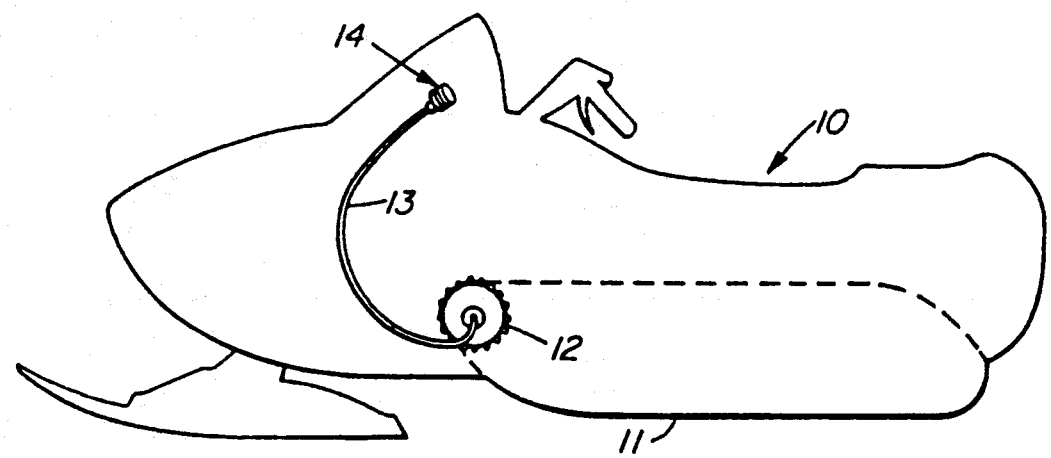
FIG. 1 is a schematic side elevation of a snowmobile illustrating the position of a speedometer instrument and its drive cable.

The snowmobile schematically illustrated in FIG. 1 has a track 11 that is powered by a sprocket drive arrangement 12 connected to the engine of the vehicle through a suitable transmission means (not shown). A speedometer drive cable 13 is coupled to one end of the sprocket drive 12, and at is opposite end is connected to a speedometer instrument that is located in a forward part of the vehicle in a position where it will be readily visible to the vehicle operator.

Figure 2:
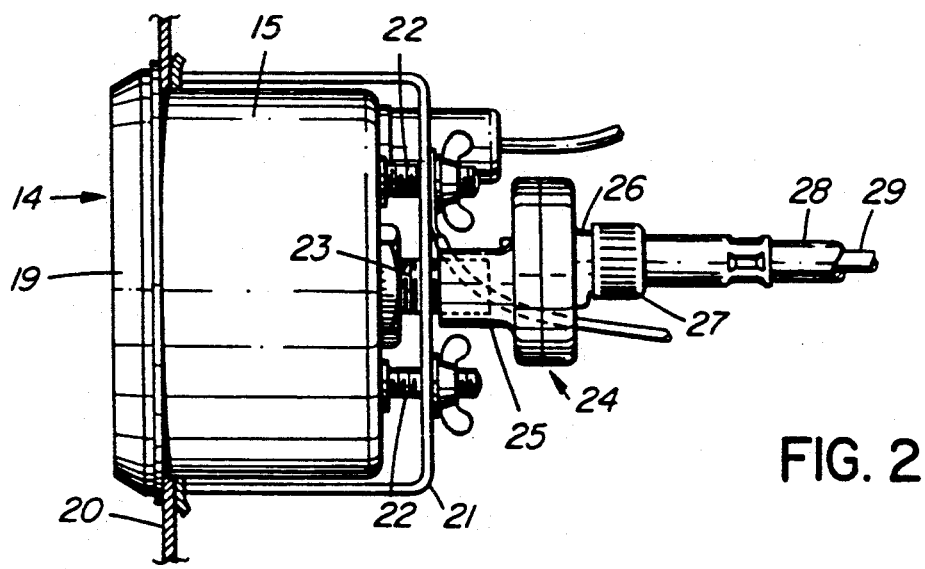
FIG. 2 is an enlarged side elevation of the speedometer instrument and the attachment thereto of the drive cable.
Figure 4:
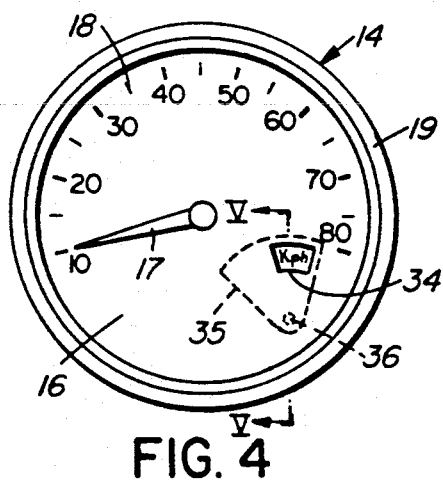
FIG. 4 is a front view of the face of the speedometer instrument.

As seen in FIGS. 2 and 4, the speedometer instrument is of conventional design comprising a cylindrical body 15 in the front of which is a circular dial 16 having an angularly movable pointer 17 that registers with a peripheral scale 18 surrounded by a leveled rim 19 the rear side of which forms a shoulder for mounting of the instrument in an aperture in a panel wall 20. The instrument is secured in position by a U-shaped clamp 21 connected to the rear thereof by threaded fasteners 22.

Figure 3:
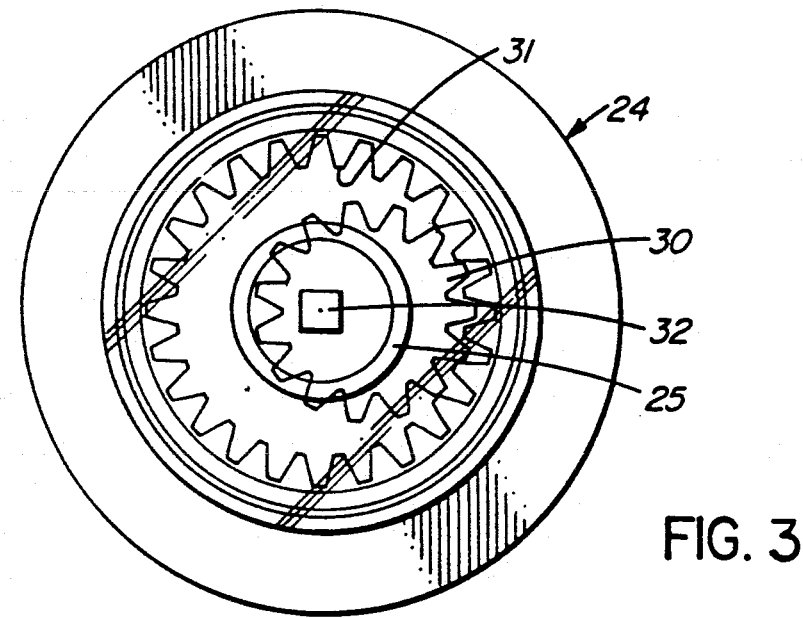
FIG. 3 is a greatly enlarged view taken on the line III—III in FIG. 2 illustrating the gear drive.

As seen in FIG. 2, the speedometer instrument 14 has an input element in the form of a hollow threaded stud 23 projecting from the rear thereof. A gear drive 24 has on one side a tubular spigot 25 in threaded engagement with the stud 23, and has on its opposite side a threaded stud 26 that is in turn engaged by a threaded nut 27 which secures the sheath 28 of the speedometer drive cable 13 to the casing of the gear drive 24. The rotatable core 29 of the drive cable passes through the stud 26 and is engaged to a gear pinion 30 rotatably mounted within the gear drive 24 as shown in FIG. 3, this pinion being in mesh with a ring gear 31 that is likewise rotatably mounted in the gear drive 24 and carries a square drive shaft 32 that projects from the spigot 25 and into the stud 23 for engagement with the input element of the speedometer instrument.

As thus configured, the speedometer drive is calibrated to give a readout in kilometers per hour. When it is desired to provide a speedometer readout in miles per hour, then the gear drive 24 is disconnected and removed and the nut 27 is threaded directly onto the stud 23 at the back of the instrument so that the cable core 29 is directly coupled to the input element of the instrument. The speedometer instrument is in fact calibrated in this configuration to give a direct readout in kilometers per hour (Kph). The transmission ratio of the gear drive 24 is chosen so that the rotation speed of the core 29 is reduced before being applied to the input element of the instrument in the ratio of the length of a kilometer relative to a mile so that by interposing the gear drive 24, the speedometer will give a direct readout of the vehicle speed in miles per hour. This is done using but a single scale and a single set of numbers so that the face of the dial is relatively uncluttered.

Figure 6:
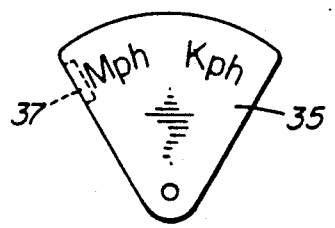
FIG. 6 is an enlarged view of a detail of FIGS. 4 and 5.

To provide an indication of the scale of speed that is being displayed on the instrument, a small window 34 is provided in the dial, and behind this is mounted a sliding plate 35 which as shown in FIG. 6 has in different areas thereof the legends "Mph" and "Kph". The plate 35 is mounted on a pivot 36 to slide behind the dial between one position in which the legend "Kph" is displayed in the window, and a second position in which "Mph" is displayed. Abutments or similar stops (not shown) can be provided to define these pivotal positions with precision.

Figure 5:
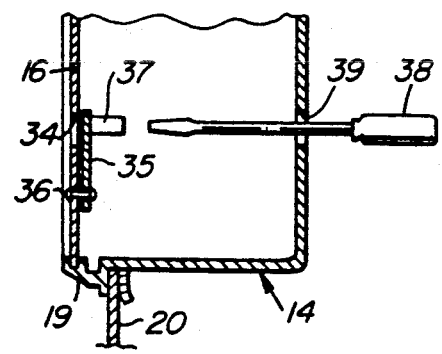
FIG. 5 is a partial sectional view taken on the line V—V in FIG. 4.

To facilitate manipulation of the sliding plate between its two positions, it is provided on its rear side with a projecting tab 37 (see FIG. 5) which may be reached by a screwdriver 38 or like instrument through a hole 39 in the rear of the instrument casing, and by means of which the plate 35 can be pivoted.

Figure 7:
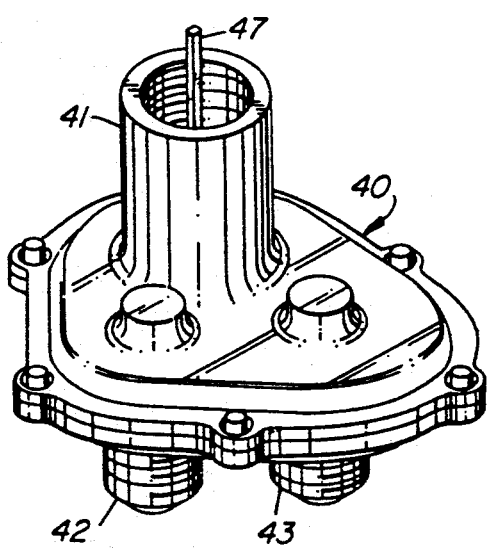
FIG. 7 is a perspective view of an alternative form of geared drive.
Figure 8:
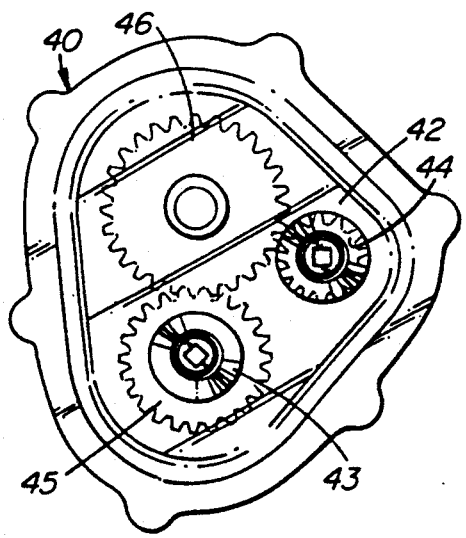
FIG. 8 is a plan view of the gear drive of FIG. 7.

In some situations, depending upon the calibration of the speedometer instrument and the characteristics of the snowmobile drive, it may be necessary to interpose a gear drive between the speedometer cable and the instrument so that the latter will give a readout in a meaningful scale, i.e. either Mph or Kph. In that event, to provide a rapid conversion from Mph to a Kph readout or vice versa, a gear drive as illustrated in FIGS. 7 and 8 is employed. This gear drive 40 also has a tubular threaded spigot 41 for engagement with the stud 23 on the rear of the speedometer, but instead of a single gear ratio, it has provision for two different gear ratios. Thus on its opposite side the gear drive 40 has two threaded studs 42, 43 each of which is configured for engagement by the nut 27 to attach the drive cable thereto, and each of which journals a gear pinion 44, 45 respectively rotatably mounted within the casing and meshing with a gear wheel 46 also rotatably mounted in the casing coaxially with the spigot 41 and having projecting therefrom a square drive shaft 47 for engagement with the speedometer input element.

Thus, in use, the gear drive 40 remains permanently secured to the rear of the speedometer instrument, and the drive cable 13 is selectively attached to the stud 42 or 43 dependent upon whether the desired readout to be displayed is to be in Mph or Kph. It is of course evident that the gear ratio of pinion 45 to wheel 46 is designed such that for the calibration of the system, the readout will be in Kph, whereas the gear ratio from pinion 45 to wheel 46 is such that a readout in Mph will be produced.

Accordingly it will be seen that by a very simple means a speedometer system is provided which is simply and rapidly convertible from one readout scale to a different readout scale. The instrument has the benefit that the dial is uncluttered since only a single numerical scale is indicated thereon, and the additional advantage is incorporated that for either configuration a visual indication is given as to the scale that is being utilized.

What I claim as my invention is:

1. A speedometer readout instrument for connection to a flexible speedometer cable in a vehicle, said cable comprising an elongate flexible drive element that is rotatable within a hollow sheath, said instrument comprising:

a casing having a display window;
   a geared unit attached to said casing to couple an input element in said instrument with an output element of said geared unit;
   first and second spigot means on said geared unit adapted selectively to form an attachment to one end of the hollow sheath of the speedometer cable, first and second input shafts in said geared unit associated with said first and second spigots respectively and each connected to said output element through a respective first or second transmission ratio; said first and second input shafts being selectively coupled to the speedometer drive element by attachment of the cable sheath to the associated spigot;
   said instrument being calibrated to provide a readout of the speed of the vehicle in a given first scale of units when the first input shaft is coupled to the drive element of the cable, and in a second scale of units when the second input shaft is coupled to the drive element of the cable, such that the scale of units of the readout can be changed selectively by simply disconnecting the cable sheath from one said spigot and attaching it to the other; and
   means for selectively indicating in said display window the scale of units of the displayed speed.

2. A speedometer according to claim 1 wherein said means for selectively indicating the scale of units comprises an element movably positioned to the rear of a dial in said display window and adjacent an aperture therein, said element having indicia thereon representative of each of said scale of units, so that the corresponding indicia can be displayed in said aperture when said first or second input shaft of a geared unit is coupled to be driven by the speedometer cable.

3. A speedometer readout instrument as claimed in claim 1 wherein said geared unit comprises a housing that rotatably supports first, second and third gears, each of said first and second gears being in constant mesh with said third gear and being integral with said first or second input shaft respectively, said third gear being integral with said output element.

* * * * *